United States Patent Office 3,734,815
Patented May 22, 1973

3,734,815
LAMINATED SAFETY-GLASS AND CABIN FURNISHED THEREWITH
Hendrik Jan Schorel, Beverwijk, Netherlands, assignor to Koninklijke Nederlandsch Hoogovens en Staalfabrieken N.V., Ijmuiden, Netherlands
No Drawing. Filed Sept. 25, 1970, Ser. No. 75,766
Claims priority, application Netherlands, Apr. 1, 1970, 7004650
Int. Cl. B32b 17/10
U.S. Cl. 161—165                                5 Claims

ABSTRACT OF THE DISCLOSURE

Laminated safety-glass or bullet-proof glass has at least three layers of glass with plastic layers therebetween; one outer glass layer is no thicker than the other two, a first plastic layer adjacent the other outer layer has not more than 13% of the thickness of said one outer glass layer, and the plastic layer adjacent said one outer glass layer is 5 to 11 times as thick as said first plastic layer. Plate glass layers and polyvinylacetal, preferably polyvinylbutyral, plastic layers, are preferred; and relatively thick and relatively thin structures, and cabins having transparent walls thereof, are disclosed.

BACKGROUND OF THE INVENTION (1) Field of the invention. This invention relates to laminated safety-glass, comprising a number of layers of glass, alternating with layers of plastic material. Moreover, this invention relates to a cabin provided with transparent walls, in which such laminates are fitted. An exampel of such a cabin is, for instance, the cabin of a crane.

(2) Description of the prior art.—Panes of safety-glass of the well-known type in question are known amongst other things as "bullet-proof" glass panes and as glass panes for automobiles. According to a customary design, bullet-proof glass panes consist of four plates of glass each about 6 mm. (0.236") thick, which are separated by sheets of plastic material each about 0.7 mm. (0.0275") thick. In the case of glass panes for cars, there is a customary design consisting of a number of layers of thin sheets of glass each about 0.9–1½ mm. (0.0354"–0.059") thick and a plastic intermediate layer of about 0.75 mm. (0.0295") thickness.

It has appeared that these and other well-known designs are not able to satisfy the requirements under circumstances such as exist in the cabins of cranes in steelworks and similar plants.

Under such circumstances the panes of glass must be resistant to extreme mechanical and thermal stresses, in which especially the mechanical stresses are of a completely different nature to those to which bulletproof panes of glass and panes of glass for cars are subjected. One possibility of circumstances likely to arise in this case consists of an explosion within a container containing molten iron or steel, where the crane cabin is in close proximity thereto. It may also happen, that a heavy object weighing several kilogrammes or tens of kilogrammes is hurled against the pane of glass. Instead of a solid object, however, a quantity of molten steel, pig iron or slag may be involved. Damage can also be caused by a violent pressurewave resulting from an explosion.

Under more normal operating conditions the panes of glass are frequently exposed to heatradiation or transfer of heat by convection thereto, for instance, in the case of control cabins close to periodical sources of heat, such as converters, foundry crucibles, heated ingots for rolling and so on.

The well-known panes of safety-glass are seldom subjected to the same amount of severe thermal stress, whilst the mechanical stresses thereon are, as a rule, of a quite different nature. For example bullet-proof glass panes or glass panes for cars which are able to stop bullets fired at them, are smashed when they are hit by heavier objects but at a lower speed. The latter is even the case when the kinetic energy of the heavier object is considerably less than that of the fired bullet.

SUMMARY OF THE INVENTION

The pane of safety-glass of the type according to the invention must be able to satisfy the following requirements:

Even when repeatedly coming into contact with relatively slow but comparatively heavy objects, the pane of glass must still remain substantially integral without large pieces of glass falling out, Where the pane of glass is subjected locally to heavy damage or is smashed the remainder of the pane of glass must still be completely transparent for the purpose of using the cabin for control purpose.

The pane of glass must be resistant to relatively severe thermal shock loads, such as, for instance, those resulting when molten steel splashes on to it, It must be possible for the panes of glass to resist completely a combined effect of severe mechanical and severe thermal shock loads, and, after being damaged, it must remain as a result thereof completely transparent, In the case of severe thermal damage the pane of glass must not catch fire, or at least it must not be difficult to extinguish the fire, notwithstanding adequate strength, the pane of glass must remain completely transparent and offer an uninterrupted view in relatively gloomy surroundings, The pane of glass must be stable, also where there is long-term uniform thermal stressing, The pane of glass must possess full heatinsulating properties, so that an equable atmosphere may be maintained behind the pane of glass.

It is apparent, that none of the wellknown panes of glass are able to comply in full measure to a combination of all these requirements. A laminate assembled for testing, consisting of one or more panes of glass stacked together (a number of thin layers of glass, separated by relatively thick sheets of plastic material) of a design similar to panes of glass for cars, appears, for instance, to possess inadequate breaking-strength in the case of shock-loading by heavy objects, but above all to possess the disadvantage of being practically completely opaque after damage.

Moreover, these panes of glass easily catch fire after being damaged by molten metal, and then it is not easy to put out the flames. The panes of glass offered commercially as bullet-proof appear, in particular, to have insufficient strength to be able to withstand damage by heavy and relatively slow objects. Comprehensive tests with a very large number of designs of panes of glass have provided the knowledge, that the success of a pane of safety-glass under the circumstances described is dependent on the choice of kind of sheets of glass applied and the thickness, but also, on the thickness and the strength of the intermediate layers and, above all, on the sequence in which the various layers are stacked for lamination.

This invention consists in that the pane of glass comprises at least three layers of glass, the rearmost of which has at most the same thickness as the two others; that the first layer of plastic material between the first and middle layers of glass has a thickness of less than 13% and, preferably, more than 5% of the thickness of the first (front) layer of glass and that the second layer of plastic material has a thickness of from 5 to 11 times the thickness of the first layer. It is assumed herein that the first layer is first as to its proximity to the side from which heat and molten metal may influence the pane of glass. Naturally, the stack can still be enlarged by applying one or more plates of glass against the front face. These do, however, no more contribute essentially to the special results of the new pane of glass according to the invention.

The success of a similar design of glass pane can be explained by hindsight as follows:

The first and middle plates of glass serve the purpose of absorbing sufficient heat when in contact with molten steel or pig iron, hurled about in an explosion to protect the next relatively thick layer of plastic material. The front layer of plastic material should, however, be relatively thin to restrict the danger of a fire therein. The combination of the first two plates of glass with the intermediate thin foil of plastic has the effect, when intercepting a heavy object, of providing a more uniform distribution of the pressure onto the next following thicker layer of plastic material, which is mainly responsible for a great resistance to heavy mechanical stressing.

This thicker layer of plastic material is, moreover, more or less protected against damage by sharp objects by the plates of glass situated in front thereof. The rearmost pane of glass serves mainly as a protection for the thicker layer of plastic material against dirt, damage and desiccation, but also for keeping the foil very transparent. As the thick plastic foil is the layer that has to assimilate the highest amount of mechanical work, this will serve its purpose as long as there is sufficient glass left to keep it in place. Hence, the thickness of the sheets of glass must be related to the thickness of the foil.

The relatively thin layers of glass in the case of panes of glass for cars are for this reason the cause why these latter provide relatively little resistance against impact from heavy objects.

The rearmost layer should not be too thick, on account of the fact that its splinters should not be dangerous, and also hardened glass should not be chosen due to the fact that the pane of glass would become opaque when damaged. It appears, that optimal results may be anticipated, if a quality of glass is used with an accurately plane surface. In spite of what might have been expected, no advantage is offered by selecting hardened glass for one of the glass layers. According to the invention, good results are obtained if the layers of glass consist of genuine plate-glass, whereby these are laminated with plastic foils based on polyvinylacetal. Especially good results were, for instance, obtained by selecting polyvinylbutyral as the plastic material. It is noticed, that the use of polyvinylbutyral in safety-glass panes is as such generally known and, above all, was described in United States patent specification No. 3,441,361.

DESCRIPTION OF PREFERRED EMBODIMENTS

Depending on the requirements to be made to the panes of glass, it is possible to arrange for these to be thicker or thinner. There are, however, limits by the fact, that the single plates should not be too thick or too thin. If they are actually too thick (thicker than 10 mm.–0.39"), then the pane becomes opaque in the case of damage. Glass plates which are too thin should also be avoided, as these (less than 5 mm.–0.196") provide inadequate protection against thermal damage to the first thin layer of plastic material. Moreover, with too thin a glass plate there is too great a risk of mechanical damage of the pane at its frame. Good results are obtained by means of the invention, where there is a total thickness of pane of 20–40 mm. (0.787"–1.574"). An example of such a pane of glass, which accords well with the invention, consists of one where each of the layers of plate-glass are about 6 mm. (0.236") thick, separated by plastic foils about 0.76 mm. (0.03") and 3.8 mm. (0.15") thick respectively.

Another embodiment of the invention, which provides good results, consists in that the layers of plate-glass are of thicknesses of 10 mm., 10 mm. and 6 mm. (0.39–0.39–0.236") resp., separated by plastic foils of about 0.76 mm. (0.03") and 7 mm. (0.275") respectively.

In order to increase the insulating effect of the panes of glass against heat radiation, it is also possible, according to the invention, to finish off the first plate of glass, by depositing a metal thereon from a gas or vapor atmosphere, said metal being preferably gold or silver. This technique is well-known in respect of panes of glass in which the transparency remains adequate.

The invention not only relates to panes of glass as described above, but also to a crane cabin or similar space protected by panes of glass, which space at least in part is separated from the surroundings by one or more panes of safety-glass of the type described above. Such spaces may also be, for instance, control cabins or operating rooms above rolling-mills, metal pouring stations and the like. The invention will further be explained with reference to a review of test results of panes of glass according to the invention and of comparable material.

For the purpose of comparison, well-known panes of safety-glass and panes of glass which were made in trying to find the most favorable solutions, were also tested.

(I) Tested materials

The panes of glass tested were composed of the following component parts:

(a) Glass plates 6 mm. (0.236") plate-glass
(b) Glass plates 10 mm. (0.39") plate-glass
(c) Glass plates 15 mm. (0.59") hardened glass
(d) Glass plates 12 mm. (0.47") plate-glass
(e) Glass plates 1.2 mm. (0.047") plate-glass
(f) Glass plates 1.0 mm. (0.039") plate-glass
(g) Polyvinylbutyral foil 2.3 mm. (0.905")
(h) Polyvinylbutyral foil 0.7 mm. (0.0275")
(i) Polyvinylbutyral foil 0.76 mm. (0.3")
(k) Polyvinylbutyral foil 5.0 mm. (0.196")
(l) Polyvinylbutyral foil 7.0 mm. (0.275")
(m) Polyvinylbutyral foil 1.8 mm. (0.0708")
(n) Polyvinylbutyral foil 3.8 mm. (0.15")

A foil is used, which is marketed under the trade name "Saflex," made by Monsanto Co.

Out of these component parts the following combinations were tested:

TABLE I

| Sample | Composition of the pane of safety-glass, from front to rear | Thickness, mm. |
|---|---|---|
| A | a; h; a; h; a; h; a (armoured glass) | 26 (1.02") |
| B | a; h; a; h; a; h; a; h; c | 26 (1.02") |
| C | b; g; b; g; b | 34.6 (1.36") |
| D | a; i; a; i; a; k; c | 40 (1.574") |
| E | b; i; b; l; a | 34 (1.34") |
| F | d; k; a; k; a | 34 (1.34") |
| G | e; m; f; m; e | 7 (0.275") |
| H | (e; m; f; m; e) x 6 | 42 (1.653") |
| J | a; i; a; n; a | 22.6 (0.9") |
| K | (e; m; f; m; e) x 2 | 14 (0.551") |
| L | Heat-absorbing glass (commercial grade) | 6 (0.236") |

(2) Testing Method

The well-known methods for testing panes of safety-glass are not adequate, such as those described in German standards specifications: DIN 52393, on testing for bending, DIN 52304, on testing for temperature-shock,
DIN 52306, on testing for ball-drop loading,
DIN 52307, on testing for arrow-drop loading.

All these well-known tests reproduce conditions, which are too mild to be able to serve as comparison criteria for the operative conditions to which the panes of glass according to the invention are exposed. Each of the following tests were applied to all or part of the samples.

Drop test

A pane of glass was clamped loosely in a frame, then weights were dropped on the centre of it. A high-speed cine-camera (movie-camera) was used to follow the behaviour of the glass during the drop-tests. In earlier tests, panes of glass 40 x 60 cm. (15.7" x 23.6") were clamped in the frame, but later a change was made to panes of glass 50 x 50 cm. (19.7" x 19.7"). Differences in the results of the tests obtained with these two sizes of glass panes are negligible.

Testing was carried out with weights of 7.8 kg. (17.2 lbs.) and 16 kg. (35.27 lbs.) respectively, the weights consisting of cylindrical steel bars with a diameter of 80 mm. (3.15"). At one end, the bars were conically pointed with a cone angle of 90°, the pointed end being rounded off with a radius of 20 mm. (0.78").

The following determinations were carried out:

(a) Height of drop of the light weight, for which the pane of glass was penetrated after 1 drop.
(b) The same for the heavy weight.
(c) Height of the drop of the light weight, for which this latter just did not penetrate the pane of glass after 1 drop.
(d) The same for the heavy weight.
(e) Transparency after determination (c)
(f) The same after determination (d)
(g) Number of drops of the light weight from approximately 7.5 m. (24'7") before the glass was penetrated.
(h) The same for the heavy weight.
(j) Transparency after determination (g)
(k) The same after determination (h)
(l) Number of drops of the heavy weight from 12.8 m. (42') before the glass was penetrated.
(m) Transparency after determination (l)
(n) Number of drops of the light weight from 6.2 m. (20'4") before the glass was penetrated.

Fire test

Ladles holding 0.3 dm.³ (1.15 cu. ft) of molten steel were emptied quickly from a height of 6.35 m. (20'10¾") on to the pane of glass. If adequate, a drop-test followed with a weight of 16 kg. (35.27 lbs.) from a height of 6.2 m. (20'4").

The following determinations are carried out:

(o) Combustibility in the case of a single pouring of 0.3 dm.³ of molten steel, followed by the drop-test being carried out once, combined with an evaluation of the coherence in the glass laminate.
(p) After determination (o) two portions each of 0.3 dm.³ of molten steel were poured on to the same plates on the same spot, followed by the drop-test carried out once, determination of combustibility and evaluation of the coherence of the glass laminate. The "combustibility" is judged to be "good" if no ignition takes place, "satisfactory," if any fire dies out automatically or if simply extinguishable ignition occurred.

Tests for resistance to temperature

The panes of glass were exposed at regular intervals to a radiation of 1100° C.

(r) The time is determined, during which the pane of glass remained intact.

The panes of glass were maintained at a temperature of 100° C. in a drying oven.

(s) The behaviour of the panes of glass was determined (good=no gas-bubbled are formed, moderate=a limited number of bubbles are formed).

A flow of heat of 1000 kcal./hr. m.² was led through the panes of glass.

(t) The temperature-increase on the rearside of the glass related to a starting-temperature of 28° was determined after 7 minutes.

Light-transparency test (u) The light being transmitted perpendicularly through the pane of glass from an electric incandescent lamp, was determined.

(3) Test results

The following summary gives the results of determinations made on the various samples. In general no further tests were made on samples, which appeared to be insufficient in one test.

| Determinations | | Sample | | | | | | | | | | |
|---|---|---|---|---|---|---|---|---|---|---|---|---|
| Strength | Transparency | A | B | C | D | E | F | G | H | J | K | L |
| a | | | | | | | | 5 m | | | | 0.26 m |
| b | | 4 m | | | | | | | | | | 0.13 m |
| c | | 2 m | | | | | | | | | | |
| | | 3 m | | 6.3 m | | | | | | | | |
| | e | | | Poor | | | | | Poor | | Good | Poor |
| | f | | | | | | | | | | | |
| g | | | | 4x | 9x | | | | | | | |
| h | | | | 2x | | | | | | | | |
| | j | | | Mod | Poor | | | | | | | |
| | k | | | Good | | | | | | | | |
| l | | | | | | 1 3½ | 4 | | A few times. | ² 2 | | |
| | m | | | | | Good | Poor | | Poor | Acceptable. | | |
| n | | | | | | | | | 1 | | 1 | |
| Fire test | | | | | | | | | | | | |
| o | | | | | Saty | Good | | Poor | Poor | Good | Poor | |
| p | | | | | (³) | Saty | | | | Saty | | |
| Thermal behavior | | | | | | | | | | | | |
| r | | | | | | 15 days | | | | | | 15 days. |
| s | | | | | | Good | Mody | | | | | |
| t | | | | | | 4° C. (= good). | | | | About 6.5° C. | | 87° C.(= poor). |
| Optical behavior | | | | | | | | | | | | |
| u | | | | | | 83% (= good). | | | | 88% | | 77% |
| Thickness, mm | | 26 | 26 | 34.6 | 40 | 34 | 34 | 7 | 42 | 22.6 | 14 | 5 |

¹ Average of a number of determinations.
² In the case of a drop-test with a weight of 8 kg. (17.63 lbs.) from a height of 12.8 m. (42'), pane resisted 5 drops.
³ Moderately extinguishable flame.

The results of the determinations, on the basis of which certain samples were rejected, are shown in a frame. The fact that not for all samples the same tests were carried out is explained by the fact, that the tests were made in a certain sequence of the samples, whereby it was anticipated that more severe requirements could be made to some samples more to the right in the table given above. Thus, for instance for Sample E no determinations were made sub (a) to (k), because from the results of the determinations $l$ and $m$ it appears that this glass stands up well to the more severe drop-tests. It is obvious from the Summary, that only the panes of glass E and J satisfy completely all the requirements. These panes of glass are the only ones which satisfy the requirements specified above for the invention. In the case of further tests, it always appeared that panes of glass which were mainly composed in accordance with the invention, in the case of tests according to the given type, but also in practice when applied to cabins of the type mentioned, possess properties which are superior to those of different pane-designs.

It is particularly noticeable in practice, that these panes of glass offer the operating personnel effective protection against molten steel in steelworks, where steel is sometimes flung out of a furnace due to a violent disturbance in this furnace.

Calculation was also made of the buffer-capacity of a few of the tested panes of glass. Employed as a measurement for the buffer-capacity is the average taken of the number of kgm. work absorbed by the pane of glass in the various drop-tests, before the pane of glass gives way. It was found, that the panes of glass E and J according to the invention are superior to the panes A (armoured glass) and L (heat-absorbing glass) available commercially. As may be seen from the following table, this buffer-capacity in the case of the proposed panes of glass is very much greater, the thickness of these panes of glass obviously not being very relevant:

TABLE III

| Sample pane | A[1] | B | J | L[2] |
|---|---|---|---|---|
| Buffer-capacity, kgm | 28 | 680 | 460 | 2 |
| Thickness in mm | 26 | 34 | 22.6 | 6 |

[1] Armored glass. [2] Heat-absorbing glass.

In the following claims on the pane itself there is no reference to first layer, rearmost layer etc. as such features can not be determined unequivocally when looking at the pane alone.

I claim:
1. Improved laminated safety glass of the type made up of
    (a) layers of glass alternating with
    (b) intervening layers of plastic material, and having
    (c) at least three such layers of glass a first and second of which are outer layers while the third is a middle layer,
which is improved in that
    (d) each of said three layers of glass consists of plate glass,
    (e) each of said three layers of plate glass has a thickness of about 6 mm. (0.236″), and
    (f) the two layers of plastic material have thicknesses of about 0.76 mm. (0.03″) and about 3.8 mm. (0.15″), respectively.
2. A laminated transparent assembly suitable for use as safety glass forming a window of a structure separating a protected space from an outside region from which heat and/or hurled substances may impinge upon such window, said lamintaed assembly comprising:
    (a) layers of glass alternating with
    (b) intervening layers of plastic material, and having
    (c) at least three such layers of glass a first and second of which are outer layers while the third is a middle layer,
and wherein:
    (d) each of said layers of glass consists of plate glass,
    (e) the first of said outer layers of plate glass constitutes an impingement layer forming the face of said assembly to be exposed to said outside region,
    (f) the second of said outer layers of plate glass constitutes the face of said assembly to face the said protected space,
    (g) each of said layers of plate glass has a thickness in the range of 5 to 10 mm. (0.195 to 0.39″) with the limitations that
        (1) said middle layer has the same thickness as that of said impingement layer, and
        (2) said second outer layer has a thickness at most the same as that of said impingement layer,
    (h) the layer of plastic material adjacent said impingement layer has a thickness of from 5% to 13% of that of said impingement layer,
    (i) the layer of plastic material adjacent said second outer layer has a thickness of from 5 to 11 times that of the said layer of plastic material adjacent said impingement layer, and
    (j) the total thickness of said assembly lies in the range of 20 to 40 mm. (0.787″–1.574″).
3. A laminated transparent assembly as claimed in claim 2, wherein:
    (1) each of the glass layers has a thickness of about 6 mm. (0.236″),
    (2) the plastic layer adjacent said impingement layer has a thickness of about 0.76 mm. (0.03″),
    (3) the plastic layer adjacent said second outer layer has a thickness of about 3.8 mm. (0.15″), and
    (4) said assembly has a total thickness of about 23 mm. (0.9″).
4. A laminated transparent assembly as claimed in claim 2, wherein:
    (1) each of said impingement and middle glass layers has a thickness of about 10 mm. (0.39″),
    (2) said second outer glass layer has a thickness of about 6 mm. (0.236″),
    (3) the plastic layer adjacent said impingement layer has a thickness of 0.76 mm. (0.03″),
    (4) the plastic layer adjacent said second outer layer has a thickness of about 7.0 mm. (0.276″), and
    (4) said assembly has a total thickness of about 34 mm. (1.34″).
5. Improved safety glass as claimed in claim 2, said safety glass forming a window of a structure separating a protected space from an outside region from which heat and/or hurled substances may impinge upon said window, said safety glass having its thinner plastic layer closer to said outside region than its thicker plastic layer.

References Cited

UNITED STATES PATENTS

| 3,498,871 | 3/1970 | Hand | 161—199 |
| 3,009,845 | 11/1961 | Wiser | 161—404 |
| 2,345,336 | 3/1944 | Fox | 161—404 |
| 2,239,527 | 4/1941 | Kamerer | 161—199 |
| 3,069,301 | 12/1962 | Buckley et al. | 161—199 |
| 3,135,645 | 6/1964 | Burkley et al. | 161—404 |
| 2,991,209 | 7/1961 | Worrall | 161—404 |

DANIEL J. FRITSCH, Primary Examiner

U.S. Cl. X.R.

89—36 A; 161—196, 199, 404